(12) United States Patent
Frascino

(10) Patent No.: US 8,571,944 B2
(45) Date of Patent: Oct. 29, 2013

(54) SYSTEM OF DISTRIBUTING COMMISSIONS WITHIN A RELATIONSHIP NETWORK

(75) Inventor: Fabio Schenberg Frascino, São Paulo (BR)

(73) Assignee: Mutual Tree Atividades de Internet LTDA., Sao Paulo (BR)

(*) Notice: Subject to any disclaimer, the term of this patent is extended or adjusted under 35 U.S.C. 154(b) by 254 days.

(21) Appl. No.: 12/911,435

(22) Filed: Oct. 25, 2010

(65) Prior Publication Data

US 2011/0264545 A1    Oct. 27, 2011

Related U.S. Application Data

(60) Provisional application No. 61/327,823, filed on Apr. 26, 2010.

(51) Int. Cl.
*G06Q 30/00* (2012.01)

(52) U.S. Cl.
USPC .......................................................... 705/26.1

(58) Field of Classification Search
USPC ............. 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2

See application file for complete search history.

(56) References Cited

U.S. PATENT DOCUMENTS

| | | | |
|---|---|---|---|
| 6,415,265 B1 | 7/2002 | Shell et al. | |
| 7,346,550 B2 | 3/2008 | Shaftel | |
| 7,844,492 B2* | 11/2010 | Perkowski et al. | 705/14.4 |
| 7,917,402 B2* | 3/2011 | Rolf et al. | 705/26.1 |
| 8,015,075 B2* | 9/2011 | Silkey et al. | 705/26.41 |
| 2002/0069077 A1 | 6/2002 | Brophy et al. | |
| 2002/0091649 A1* | 7/2002 | Anvekar et al. | 705/72 |
| 2004/0133445 A1 | 7/2004 | Rajan et al. | |
| 2004/0148190 A1 | 7/2004 | Barnard et al. | |
| 2004/0249658 A1 | 12/2004 | Schwerin-Wenzel et al. | |
| 2004/0267567 A1 | 12/2004 | Barrera et al. | |
| 2006/0143029 A1 | 6/2006 | Akbay et al. | |
| 2006/0149582 A1 | 7/2006 | Hawkins | |
| 2007/0033059 A1 | 2/2007 | Adkins | |

(Continued)

FOREIGN PATENT DOCUMENTS

| | | |
|---|---|---|
| KR | 1020050112366 | 11/2005 |
| WO | 2009042251 | 4/2009 |

OTHER PUBLICATIONS

Anne T. Coughlan et al. "Network marketing organizations: Compensation plans, retail network growth, and profitability", International Journal of Research in Marketing 15 (1998) 401-426.*

(Continued)

*Primary Examiner* — Naeem Haq
(74) *Attorney, Agent, or Firm* — Myers Wolin, LLC

(57) ABSTRACT

A system for distributing commissions within a relationship network comprising a network manager, at least one network affiliate that has an affiliate relationship with the network manager, and at least one network member that has a member relationship with the network manager, wherein a transaction between a network affiliate and a network member generates a commission by the network affiliate, a first portion of the commission being retained by the network manager, a second portion of the commission being distributed to the transacting network member, and a third portion of the commission being distributed as a donation to at least one donation beneficiary that promotes environmental or social concerns that is external to the relationship network.

28 Claims, 11 Drawing Sheets

(56) References Cited

U.S. PATENT DOCUMENTS

| | | |
|---|---|---|
| 2008/0015871 A1 | 1/2008 | Eder |
| 2008/0033744 A1* | 2/2008 | Jones .................................. 705/1 |
| 2008/0046268 A1 | 2/2008 | Brown |
| 2008/0221994 A1* | 9/2008 | Rutz et al. ........................ 705/14 |
| 2008/0281690 A1 | 11/2008 | Tietzen et al. |
| 2009/0150232 A1* | 6/2009 | Tyler et al. ....................... 705/14 |
| 2010/0023365 A1* | 1/2010 | Cifelli ................................. 705/7 |
| 2010/0070343 A1 | 3/2010 | Taira et al. |
| 2010/0070344 A1 | 3/2010 | Taira et al. |
| 2010/0094695 A1 | 4/2010 | Gaik |
| 2010/0138506 A1* | 6/2010 | Van ................................. 709/206 |
| 2010/0211530 A1* | 8/2010 | Tazawa ........................... 705/500 |
| 2012/0010926 A1* | 1/2012 | Urso ............................. 705/7.42 |
| 2012/0209676 A1* | 8/2012 | Tyler et al. .................. 705/14.16 |
| 2013/0204672 A1* | 8/2013 | Campbell ..................... 705/7.39 |

OTHER PUBLICATIONS

International Search Report and Written Opinion issued for corresponding International Application No. PCT/ US2011/033830 with mail date of Feb. 8, 2012.

* cited by examiner

SYSTEM OF DISTRIBUTING COMMISSIONS WITHIN A RELATIONSHIP NETWORK

CROSS-REFERENCE TO RELATED APPLICATIONS

This application claims the benefit of U.S. Application 61/327,823, filed Apr. 26, 2010, which is incorporated by reference herein.

FIELD OF THE INVENTION

The present invention relates to a relationship network generally, and more particularly to a method of incentivizing and rewarding suppliers and customers to do business with each other in order to generate loyalty among the suppliers and customers and benefit environmental and/or social causes selected by network members.

BACKGROUND

Consumers typically do business with companies in order to obtain a particular good or service. Some companies tout their social or environmental awareness, and some companies even promote that a certain portion of a purchase will be donated to a worthy cause. Certain consumers connect with this type of company messaging such their purchasing decision may be steered toward these companies if the consumers sense an affiliation with, or an appreciation for the company ethic portrayed by its messaging and its philanthropy.

However, while certain consumers experience a certain level of euphoria by doing business with companies that are aligned with certain social and environmental messaging, the benefit tends to be one-sided. When a company utilizes a portion of a consumer's purchase to benefit a third party, the consumer purchase generally does not result in an additional tangible benefit flowing from the company back to the consumer, which might otherwise incentivize the consumer to do business with the same company in the future versus other companies that might have similar social or environmental messaging. From the company perspective, there is also no added incentive to do business with one consumer over another consumer where the primary purpose for the company is to conclude a transaction that will result in a financial benefit to the company.

In order to create brand loyalty and repeat customers, companies have created shopping clubs, where each purchase by a consumer results in the consumer receiving points, or miles for airlines for example, or other forms of pseudo-currency that can be aggregated and redeemed by the consumer at a later date for products or services from the company. This type of system of points or miles or cash back, etc., is also a primary motivator used by credit card companies to lure consumers, for it is rare nowadays to find a credit card that does not convey some type of ancillary benefit to the consumer. This type of system, however, is another example of a benefit that is unilaterally experienced by the consumer. Again, from the company perspective, there is no added incentive to do business with one particular consumer over another consumer where the primary purpose for the company is to conclude a transaction that will result in a financial benefit to the company. The incentive response by the company of redeeming points or miles or other pseudo-currency is simply a cost of creating repeat business, where the benefit of the repeat business to the company outweighs the cost of creating a redemption scheme that is driven primarily by consumer purchasing volume.

With shopping clubs or redemption schemes or other means by companies to attract repeat consumers and create consumer loyalty, what is missing is a pursuit of a common goal that is shared by the consumer and the company and that extends to a beneficiary beyond the relationship of the consumer and company, wherein the relationship between the consumer and the company results in a shared benefit experienced by the consumer, the company and the external beneficiary. In this case, the shared relationship and common purpose incentivizes the mutual collaboration between the consumer and the company for the collective benefit of all parties to the relationship including the external beneficiary. There is a need, therefore, for a relationship network of consumers and companies that generates a mutually beneficial loyalty among the network members and that results in an additional benefit to external beneficiaries that promote social and environment causes selected by network members.

SUMMARY

A mutually beneficial relationship network includes, in one embodiment, a network manager, at least one network affiliate that has an affiliate relationship with the network manager, and at least one network member that has a member relationship with the network manager, wherein a transaction between a network affiliate and a network member generates a commission by the network affiliate, a first portion of the commission being retained by the network manager, a second portion of the commission being distributed to the transacting network member, and a third portion of the commission being distributed as a donation to at least one donation beneficiary that promotes environmental or social concerns that is external to the relationship network. The relationship network is organized to grow preferably through invitation and/or referrals, where additional network members that join the relationship network increase commercial activity with network affiliates and return greater commissions to network members and referring members and result in increased donations to donation beneficiaries.

DETAILED DESCRIPTION OF THE PREFERRED EMBODIMENTS

Figure 1:
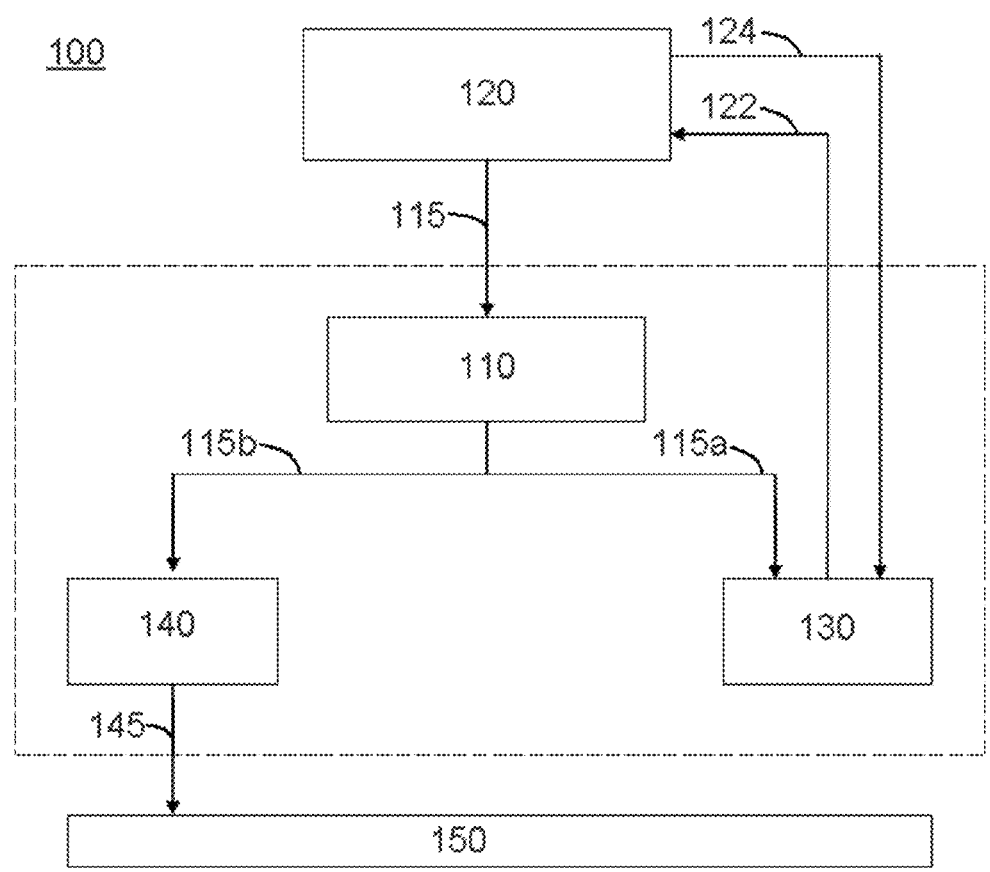
FIG. 1 illustrates one embodiment of a relationship network in accordance with the present invention.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

The present disclosure in its most general sense concerns the formation of a relationship network comprised of parties that share a common goal, namely to collaborate and co-exist in a multi-beneficial manner with one goal being that of caring for the environment and the advancement of social causes. This occurs through the creation and distribution of commissions on transactions that occur between a provider of goods/services and a consumer of goods/services, which transactions generate commissions that benefit the consumer and external projects or causes selected by network consumers. The relationship network business models of the present embodiments are based on group-dynamics, win-win games theory, which emphasizes the importance of group work cooperation, fun, sharing, caring and the success of the group as a whole. In addition, it is preferred that the relationship network carries an ethical message of caring for the environment and social care and a holistic approach to life and society.

Certain aspects of the network of the described embodiments demonstrate collaboration of network members through shared relationships and experiences, and a desire to grow the network structure preferably through referrals and invitations to other members that are aligned with the network messaging and ethics. Expansion of the relationship network increases the shared benefit and member loyalty to the network, which increases the network's overall contribution to environmental and social causes One embodiment of a relationship network 100 is illustrated in FIG. 1, which includes a network manager 110 that controls, through a server or the like, the underlying business of the network 100 as a whole and that manages and coordinates the players in the network 100, a network affiliate 120 in the nature of a company that provides goods and/or services and that has an affiliate relationship with the network manager 110, a network member 130 in the nature of a consumer of goods and/or services and that has a member relationship with the network manager 110, and a network donation manager 140 that is responsible for managing and distributing donations received from the network manager 110 to external projects or causes 150. The affiliate relationship is preferably defined by an agreement between the network manager 110 and a network affiliate 120 and preferably consists of the network affiliate 120 paying the network manager 110 a commission 115 for every business it originates through its network 100, such as, for example, through a transaction with a network member 130 whereby the network member 130 makes a purchase 122 of a product or a service 124 from the network affiliate 120. Other commissionable events are possible. The member relationship is preferably defined by an agreement between the network manager 110 and a network member 130 and preferably consists of the network manager 110 paying a portion 115a of the commission 115 the network manager 110 receives from the network affiliate 120 as a result of the network member 130 transaction with the network affiliate 120 back to the transacting network member 130. Another portion 115b of the commission 115 is preferably distributed to the network donation manager 140 that contributes a donation 145 to environmental and social projects 150, where the network donation manager 140 could be, for example, a non-governmental organization (NGO) created by the network manager 110.

While FIG. 1 illustrates a network 100 formed from a single network affiliate 120, a single network member 130, and a single donation beneficiary 150, it will be appreciated that the network 100 may consist of more than one of each network component, for it is preferable to have a extensive plurality of each network component to maximize the benefit to network members and donation beneficiaries. In one example shown in FIG. 2, network member 130 may invite additional network members 135 to the network 100, which will receive an additional portion 115c of the commission 115 as will be described in more detail below, and the donation beneficiary 150 may include multiple donation beneficiaries 150a, 150b, 150c that each receive a share of the donation 145 preferably in accordance with a voting process by the network members 130 and 135. In one non-limiting example, each donation beneficiary may receive a proportionate share (PDV) of the total donation 145 (TDA) based on a number of votes (NVP) for a certain donation beneficiary 150a, 150b or 150c relative to the number of network members 130 and 135 (NMBR) in accordance with the following equation:

$$PDV = TDA \cdot \frac{NVP}{NMBR}$$

For example, if the total donation amount TDA is $3000, and there are a total of three (3) network members NMBR, and each network member contributes one vote, and each donation beneficiary 150a, 150b and 150c receives one vote, then each donation beneficiary 150a, 150b and 150c would receive a proportionate share (PDV) of $1000 or:

$$PDV = \$3000 \cdot \frac{1}{3}$$

Other donation distribution models are possible. In one non-limiting example, the funding mechanism will occur on a semester basis depending on the percentage of votes each donation beneficiary has at a designated time. This percentage may vary in time for the network members can change their votes to other donation beneficiaries at any moment. In such an example, only the actual votes will be accounted for on each semester calculation, i.e. if a network member voted for donation beneficiary 150a during 181 days of a 182 day semester, and on the 182nd day the network member changes the vote to donation beneficiary 150b, such vote will account for donation beneficiary 150b only. Of course, other timing and distribution schemes are possible.

It is important to note that the voting process mentioned above, in one embodiment, transforms the network members into stakeholders that allow the network members as a group to control the ultimate distribution of donation funds to donation beneficiaries. In other words, while the network donation manager 140 is preferably responsible for selecting the donation beneficiaries and managing the disbursement of donation funds to the donation beneficiaries, the ultimate decision on donation funds allocation rests with the network members. In this fashion, the network membership has a shared interest in promoting environmental and social causes and can democratically determine how donation funds are distributed. In another embodiment, the network members can determine the identity of the donation beneficiaries and the network donation manager 140 can be tasked with the limited responsibility of distributing donation funds in accordance with network member voting decisions. In such embodiments, network members ultimately control the amount of donations received by donation beneficiaries by the volume of transactions conducted with network affiliates.

Figure 2:
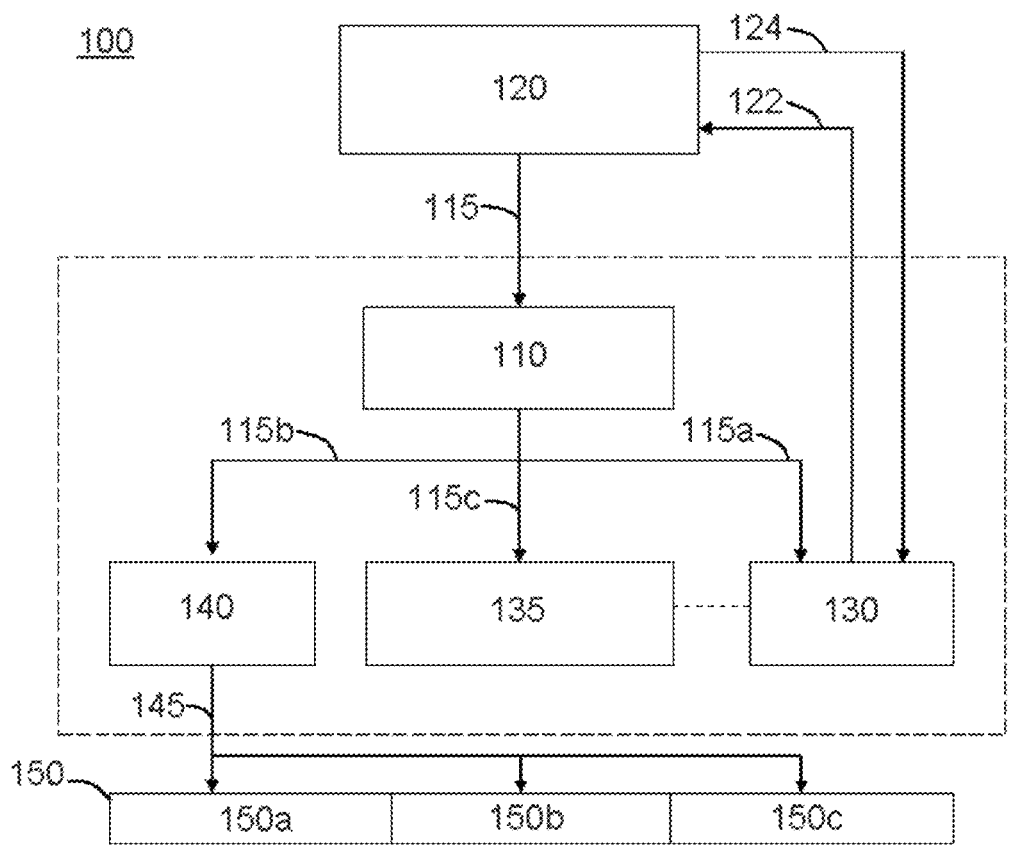
FIG. 2 illustrates an alternative embodiment of a relationship network.
Figure 3:
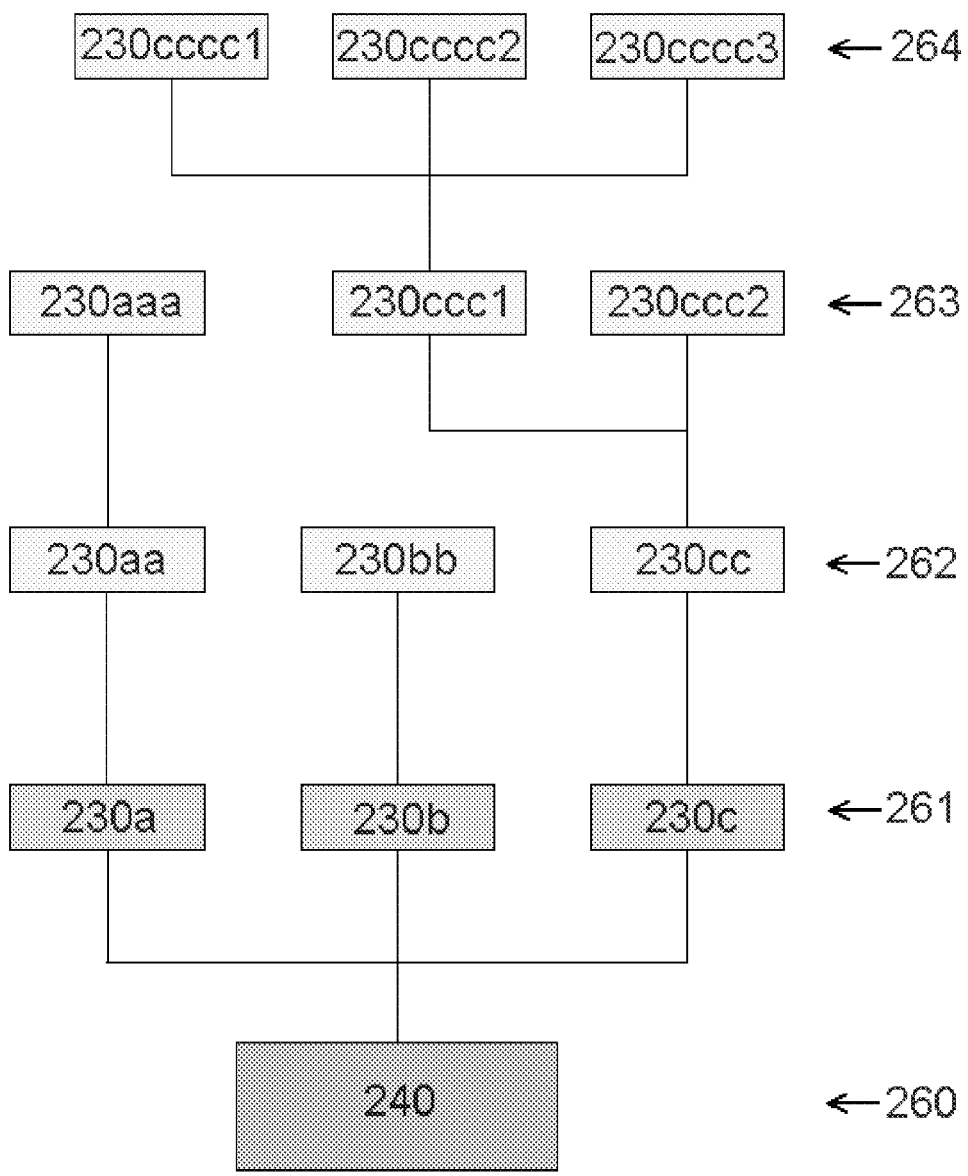
FIG. 3 illustrates one embodiment of a lineal arrangement of network members within a referral network.

FIGS. 1 and 2 illustrate certain embodiments of a simplified version of the relationship network 100 for purposes of introducing the main components that generate, distribute and donate commissions. FIG. 3 illustrates one embodiment of a more detailed formation of a relationship network 200 formed from a root member 240 defined as the network donation manager 240 and located at the bottom level 260 of the network 200, and a lineal arrangement of network members 230 located at incremental levels 261-264 relative to the bottom level 260 and the root member 240. The first level of network members 230a, 230b and 230c is considered the primary network members of the organization. Each first level network member 230a, 230b and 230c may invite, such as through an invitation emailing system that runs through the server of the network manager for example, as many people he or she wants to join their own lineal network. If the invitee accepts the invitation and decides to join the relationship network, he or she will, for example, follow the link in the invitation email to the website's new member registration page (not shown), and after successful registration, he or she will join the relationship network as a direct descendant of the network member who invited him or her. For example, with reference to FIG. 3, member 230aaa was invited by member 230aa, who was invited by primary member 230a. Similarly, members 230cccc1, 230cccc2 and 230cccc3 were each invited by member 230ccc1, who was invited along with member 230ccc2 by member 230cc, who was invited by primary member 230c. The network 200 is organized and arranged in different levels. Starting at level zero 260, which is the root member 240 level, each level represents a distance from the root member 240. In this manner, the primary network members are at the first level 261, the people they invite are at the second level 262, and so on.

Figure 4:
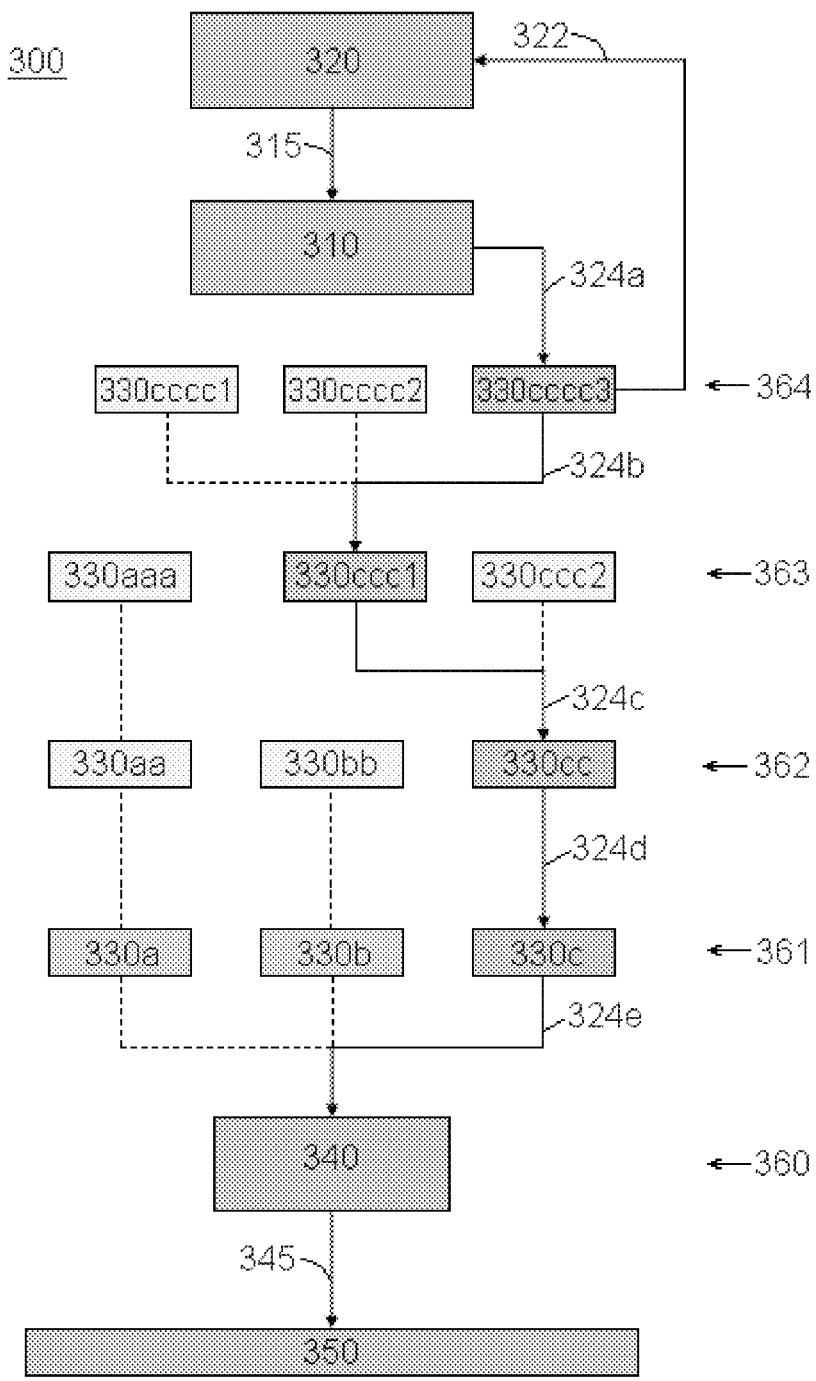
FIG. 4 illustrates one embodiment of a system of distributing commissions within a referral network.

FIG. 4 illustrates one embodiment of a method of distributing commissions through a relationship network 300 to network members 330 and to environmental/social projects 350. This is achieved based on relationship marketing concepts, which in general refers to a long-term and mutually beneficial arrangement wherein both the buyer of goods and/or services or network member 330 and seller of goods and/or services or network affiliate 320 focus on value enhancement with the goal of providing a more satisfying exchange between the parties. This approach transcends the simple purchase-exchange process and establishes a more meaningful and richer contact by providing a more holistic, personalized purchase, and to use the consumption experience to create stronger ties and customer loyalty. Relationship marketing works by rewarding its network members 330 for the business transactions conducted with network affiliates, and by rewarding network affiliates 320 with a very strong customer loyalty, and both network members and network affiliates benefit from the contribution they are giving to our planet by funding environmental conservation and social care projects 350. Furthermore, in one embodiment, the relationship network also benefits governmental and non-governmental organizations by creating taxable events with each transaction, where the commission received by the network members may be taxable, while the network members and the relationship network as a whole may realize the charitable benefit of having a portion of the commission dedicated as a donation.

As shown in the embodiment of FIG. 4, and preferably in accordance with an affiliate agreement between the network manager 310 and the affiliate company 320, for every sale made to a network member 330, the affiliate company 320 pays a commission 315 to the network manager 310 based on the value of the purchase 322. More specifically, the total commission (TC) 315 may be based on a pre-determined rate (RATE), which may be fixed or variable or a combination of the same, of a value (PV) of the purchase 322 in accordance with the following equation:

$$TC = RATE \cdot PV$$

Such RATE may be a variable rate that fluctuates depending on the value (PV) of the purchase 322. In turn, the network manager 310 pays a portion 324a-324e of the commission 315 to every network member that is related to the purchasing member by referral or invitation and at every level 360-364 along the lineal arrangement going from the purchasing member 330cccc3 responsible for the business transaction with the network affiliate 320 at level 364, down to the root member 340 at level 360. In this regard, the business transaction between network member 330cccc3 and the network affiliate 320 results in a portion of the commission 315 being distributed to referring members 330ccc1, 333cc, primary member 330c and root member 340. Root member 340 is the network donation manager that will donate to one or more environmental conservation and social care projects or donation beneficiaries 350 according to each Project Donation Value (PDV) as defined above.

Business transactions occurring between network members and affiliate companies will result in commissions 315 payable to the network manager 310 by the affiliate companies, such that the total revenue of the network manager 310 can be defined as the sum of all of the individual commissions, with each individual commission dependent on the pre-determined rate (RATE) and the value (PV) of each purchase 322. Thereafter, the network manager 310 retains a portion of each commission 315 as a management fee (MF), with the remainder of the commission being distributed to the network members 330, network donation manager 340 and donation beneficiaries 350 as described below. As an example, if the pre-determined rate percentage (RATE) is fixed at 5%, and the value of a purchase (PV) is $100, the total commission (TC) will be $5. If the management fee (MF) to the network manager 310 is based on a straight percentage, such as 10% for example, the network manager 310 would realize a management fee (MF) of $0.50 from the $5 commission, and the remaining commission fee portion of $4.50 defined as the net commission fee (NCF) would be distributed to the network members 330, network donation manager 340 and donation beneficiaries 350 as described below. Other commission rate calculations are possible.

In one embodiment, the remaining NCF is not distributed equally, but depends on the level of the purchasing member relative to the root member, and the level of every other network member in the lineal chain between the purchasing member and the root member. In one embodiment, the calculation is made by a simple fractal mathematical process by which the total residual commission fee amount is divided by two with each progression in level between the purchasing member and the root member. In this manner, the purchasing member always receives 50% or ½ of the NCF, while the network member who invited the purchasing member receives 25% or ¼ of the NCF, and his or her invitee will receive 12.5% or ⅛ of the NCF and so on. This process will continue until it reaches the root member 340, which will receive the same percentage as the primary network member in the lineal chain of network members starting with the primary network member and ending with the purchasing member.

Using FIG. 4 as an example, and assuming network member 330cccc3 (fourth level or level 364) makes a $100 purchase 322 and is designated the purchasing member, where the pre-arranged commission fee (TC) between the network affiliate 320 and the network manager 310 is 5% and the pre-arranged management fee (MF) between the network manager 310 and the network members 330 is 10%, the total commission paid (TC) as a result of the $100 transaction between the purchasing member 330cccc3 and the network affiliate 320 is $5, with network manager 310 retaining $0.50 as a management fee (MF), leaving $4.50 (NCF) to be distributed as an individual net commission (IC) to each of the network members of the lineal branch 330cccc3, 330ccc1, 330cc and 330c. Since the purchasing member 330cccc4 (level 4) receives 50% of the NCF, he or she will receive $2.25, and the next level member 330ccc1 will receive 25% of the NCF or $1.125, and the next level member 330cc will receive 12.5% of the NCF or $0.5625, and finally the primary network member 330c will receive 6.25% of the NCF or $0.28125, which is the same amount the root member 340 will receive. This is illustrated in the following table:

| NCF | % Commission Fee | Network Member | IC | Level (Ref.#) |
| --- | --- | --- | --- | --- |
| $4.50 | 50.00% | 330cccc3 | $2.25000 | 4 (364) |
| $4.50 | 25.00% | 330ccc1 | $1.12500 | 3 (363) |
| $4.50 | 12.50% | 330cc | $0.56250 | 2 (362) |
| $4.50 | 06.25% | 330c | $0.28125 | 1 (361) |
| $4.50 | 06.25% | 340 | $0.28125 | 0 (360) |

Thus, the individual net commission (IC) received by a network member in the referral lineage positioned at a network member level (NML), the referral lineage having a number of levels defined between 1 and a purchasing network member level (PML), is defined as:

$$IC(NML) = \frac{NCF}{2^{(PML-NML+1)}}$$

Thus, since the root member 340 always receives the same amount as a level one (1) network member (i.e. a primary network member) in the described embodiment, the commission of the root member 340 is defined as $$IC(\text{root}) = \frac{NCF}{2^{PML}}$$

The IC commission calculation can be represented in a general fashion with reference to the following table with "n" levels:

| NCF | % Commission Fee | IC | Level |
| --- | --- | --- | --- |
| $ NCF | 50.00% | $ NCF/2 | PML = n |
| $ NCF | 25.00% | $ NCF/4 | n-1 |
| $ NCF | 12.50% | $ NCF/8 | n-2 |
| $ NCF | 06.25% | $ NCF/$2^{(n-(n-3)+1)}$ | n-3 |
| ... | ... | ... | ... |
| $ NCF | NCF/$2^n$% | $ NCF/$2^n$ | 1 |
| $ NCF | NCF/$2^n$% | $ NCF/$2^n$ | 0 (Root Member) |

In the above described embodiments, the net commission fee (NCF) distributed to the network members is net of a management fee (MF) retained by the network manager, where such management fee is taken "off the top" of the commission paid by the network affiliate. However, other payment structures are possible. For example, instead of taking the management fee directly off the top of the total commission (TC), the network manager may delegate the total commission as the net commission fee in the above example, and then retain a different portion of the commission or the commission received by the root member or the donation manager as a management fee, in which case the management fee comes "off the bottom" of the total commission. This structure would result in increased commissions to the network members relative to the total commission received from the network affiliate.

In addition, while certain algorithms are described, it will be appreciated that other financial models are possible. In other words, while each level receives one half the commission of the previous level, it will be appreciated that other allocations are possible depending on a variety of factors that can be changed by the network management, network members or a combination of the same. For instance, the network as a whole may wish to reduce the commission received by the network members and increase the donation contributed to donation beneficiaries. Alternatively, the network may set milestones or guidelines that vary the commission/donation balance. Various business models are possible.

In the described embodiments of the business model, all of the commissions and donations are generated by the network affiliates through business transactions between network affiliates and network members. Through such interactions, network affiliates generate client loyalty because network members appreciate that each transaction results in a direct benefit to themselves, to their lineal descendants to helping the environment and needy people around the world. This benefit structure and the member relationship between the network members and the network manager incentivizes network members to do business with network affiliates rather than non-network affiliates where the business transaction benefits only the non-network affiliate.

Figure 5:
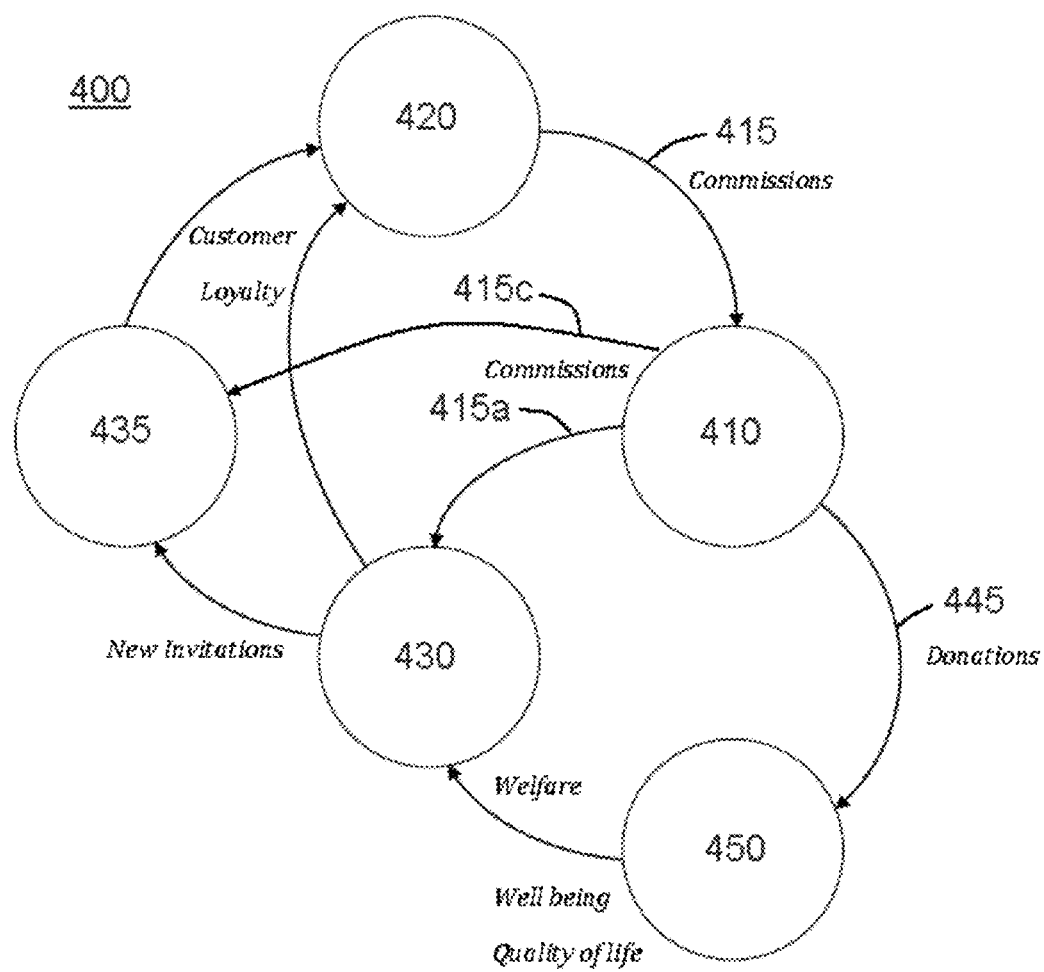
FIG. 5 illustrates one embodiment of a virtuous cycle embodying one aspect of the present invention.

Companies spend billions of dollars every year on merchandising and advertising to achieve client loyalty, however, in some cases consumers still get the impression of greediness. Contrast that with a network affiliate associated with the network manager and the relationship network that will spend similar sums in client loyalty advertisement and have their image associated with good deeds such as helping the environment and needy people by funding environmental conservation and social care projects. Being a network member and shopping at network affiliates creates a virtuous cycle and a win-win situation where everybody involved gets something back as shown, for example, in the relationship network 400 of FIG. 5. Transactions between network members 430 and network affiliates 420 generates commissions to the network manager 410, which is shared back with the network members, and new network members 435 that join the network 400, and a portion of which is distributed as a donation to environmental and social causes 450. This cycle contributes to increased welfare, well being and quality of life for network members through philanthropic activities conducted by donation beneficiaries 450, and results in increased customer loyalty for network affiliates.

Figure 6A:
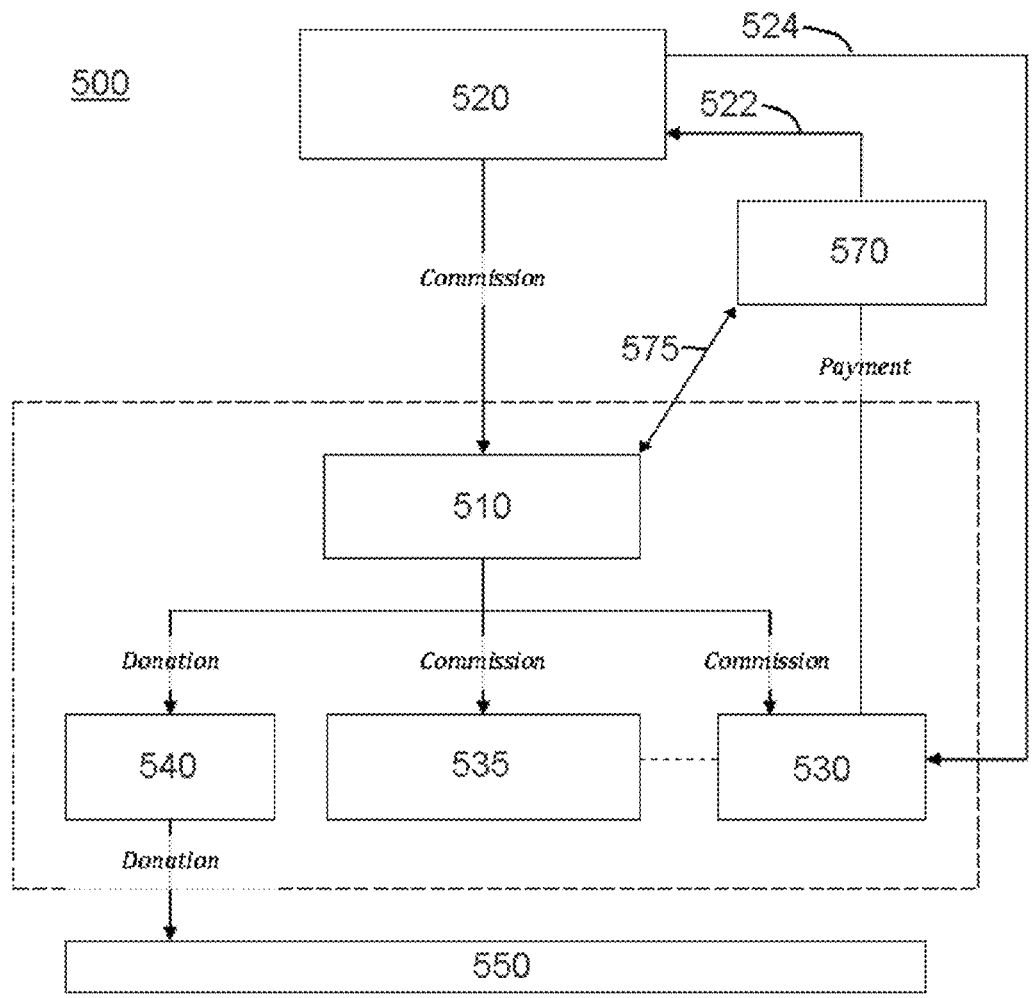
FIG. 6A illustrates one embodiment of a relationship network in accordance with the present invention including a transaction affiliate.

FIG. 6A illustrates one embodiment of a relationship network 500 including a network manager 510, a network affiliate 520, network members 530 and 535, a donation manager 540, and a donation beneficiary 550, that is structurally similar to the network 100 of FIG. 2, but with the addition of a transaction affiliate 570 between the network member 530 and the network affiliate 520. The transaction affiliate 570 could be a payment intermediary as shown, such as a credit card that is affiliated with the network manager 510 through a transaction affiliate agreement or the like, or a credit card that is sponsored by or created by the network manager 510, or it can be another type of commercial intermediary or system that is related to a purchase 522 made by a network member 530 that results in a good or service 524 being conveyed back to the network member 530. In the embodiment of FIG. 6A, the relationship 575 between the transaction affiliate 570 and the network manager 510 can be purely informational such that, for example, every time a network member 530 shops at a network affiliate 520 through any means (i.e., in store, online, etc.) and transacts business through the transaction affiliate 570 through the use of an affiliate credit card or the like, the network member 530 will be automatically identified to the network manager 510 as being a network member that is affiliated with the network 500 and his purchase will be automatically computed and processed by the network manager 510. However, in the embodiment of FIG. 6A, the transaction affiliate 570 is simply the payment intermediary and does not contribute any commissions to the network manager 510 or its members 530, 535 or donation beneficiaries 550 (i.e. to the network 500 as a whole). Accordingly, there is no incentive by network members 530, 535 to use the transaction affiliate 570 versus other transaction affiliates, such as other credit cards, since the network 500 as a whole does not benefit through increased commissions that result in commissions to network members and/or increased donations to donation beneficiaries 550.

Figure 6B:
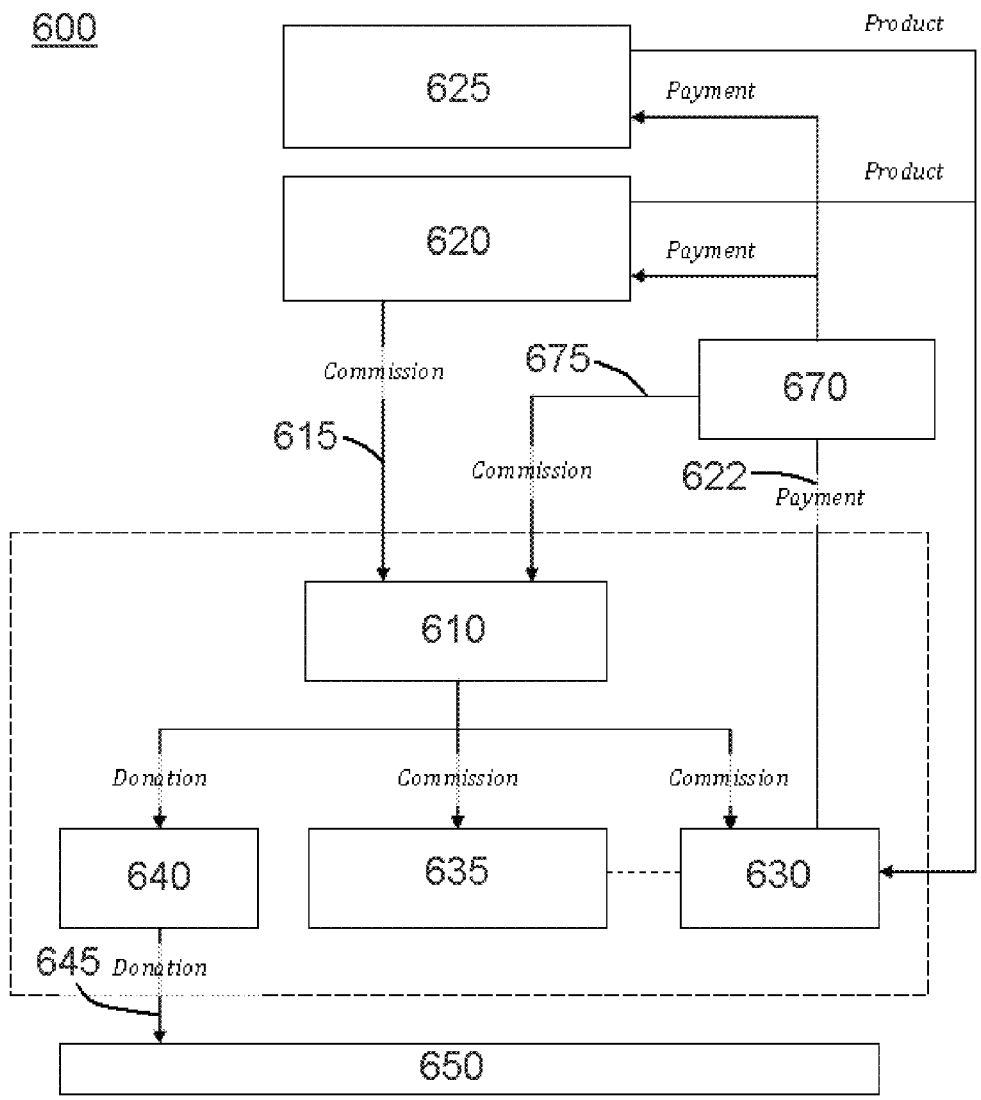
FIG. 6B illustrates an alternative embodiment of a relationship network including a transaction affiliate.

FIG. 6B illustrates a preferred embodiment of a relationship network 600 including a network manager 610, a network affiliate 620, network members 630 and 635, a donation manager 640, a donation beneficiary 650, and a transaction affiliate 670 that returns a commission 675 to the network manager 610 for the benefit of the network 600 as a whole. The transaction affiliate 670 in the embodiment of FIG. 6B functions with respect to the network 600 similar to a network affiliate 620 in the sense that the transaction affiliate 670 pays a commission 675 to the network manager 610 as a result of a transaction with a network member 630, where the commission 675 is preferably based on a value of the transaction 622, such as a value of a purchase of goods or services, where the commission 675 can be a fixed amount or a fixed percentage of the purchase price 622, or it can be variable depending on the affiliate arrangement between the transaction affiliate 670 and the network manager 610 and depending on the value 622 of the purchase. For example, the commission 675 (and/or the commission if desired, for example) may be a tiered commission with a minimum commission established up to a certain purchase price 622 (PP), a maximum commission established for a certain purchase price 622 and over, and then a modified commission structure in between, such as:

| Purchase Price (PP)(622) | Rate | Commission (675) |
|---|---|---|
| $0.00-$99.99 | $1.00 Minimum | $1.00 |
| $100.00-$999.99 | $0.50 + 0.50% (PP) | $1.00-$4.99 |
| $1000.00-$8999.99 | $2.50 + 0.25% (PP) | $5.00-$24.99 |
| $9000.00+ | $25 Maximum | $25.00 |

Figure 6C:
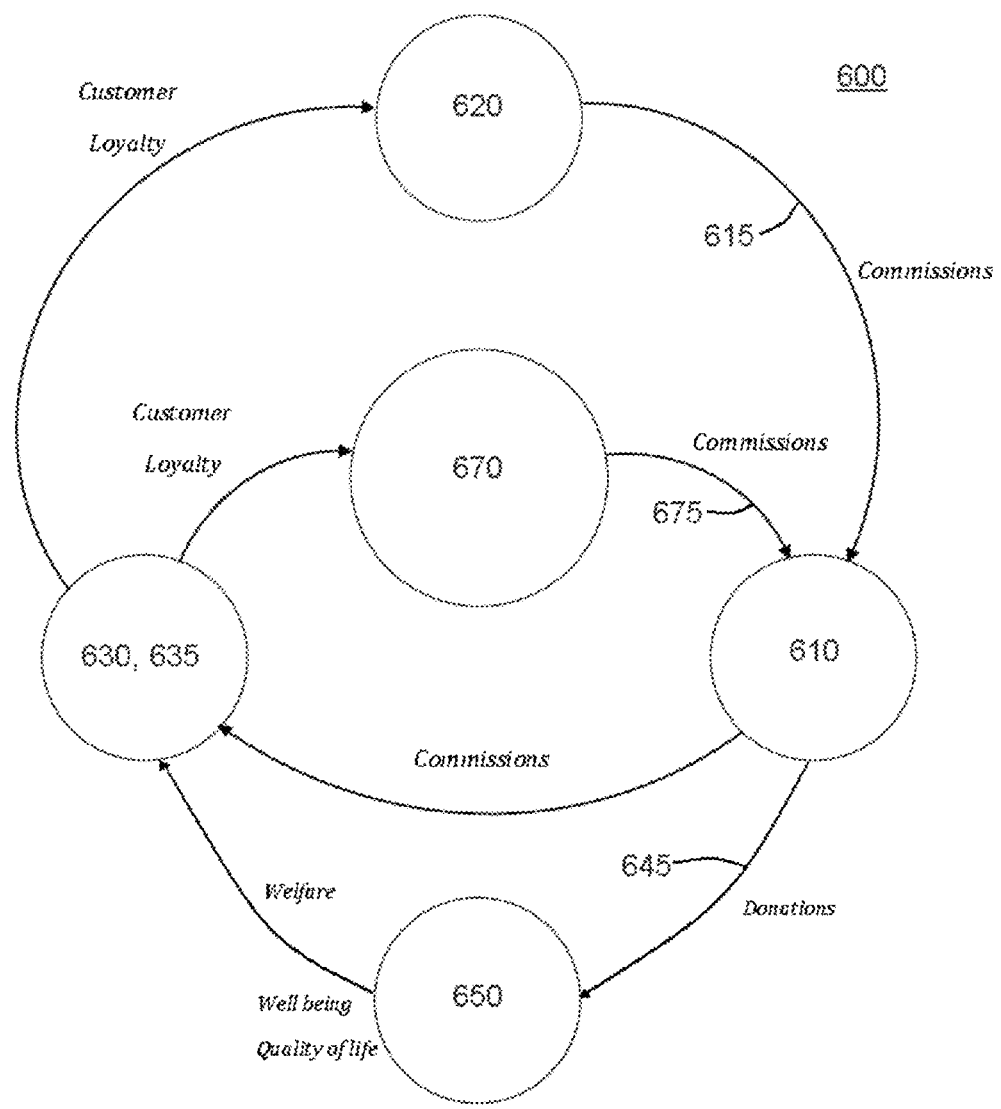
FIG. 6C illustrates one embodiment of a virtuous cycle embodying one aspect of the present invention.

Other commission determinations are possible, with different percentage allocations, and/or without the designation of a maximum commission. In the embodiment of FIG. 6B, a network member 630 can utilize the transaction affiliate 670 to make a purchase at a network affiliate 620 that has an affiliate relationship with the network manager 610, which would generate both a network affiliate commission 615 and a transaction affiliate commission 675, or to make a purchase at a non-network affiliate 625 that does not have an affiliate relationship with the network manager 610, which would only generate a transaction affiliate commission 675. In either case, the network 600 as a whole benefits from the affiliate relationship between the network manager 610 and the transaction affiliate 670 and the commission 675 that is generated. In the embodiment of FIG. 6B, the network 600 benefits the most from a network member 630 using a transaction affiliate 670 to make a purchase 622 at a network affiliate 620. Thus, being a network member 630, 635 and shopping at network affiliates 620 using transaction affiliates 670 creates an enhanced virtuous cycle as shown in FIG. 6C where everybody is involved and everybody receives a benefit. This cycle contributes to increased welfare, well being and quality of life for network members through philanthropic activities conducted by donation beneficiaries 650, and results in increased customer loyalty for network affiliates 620 and transaction affiliates 670.

Figure 7:
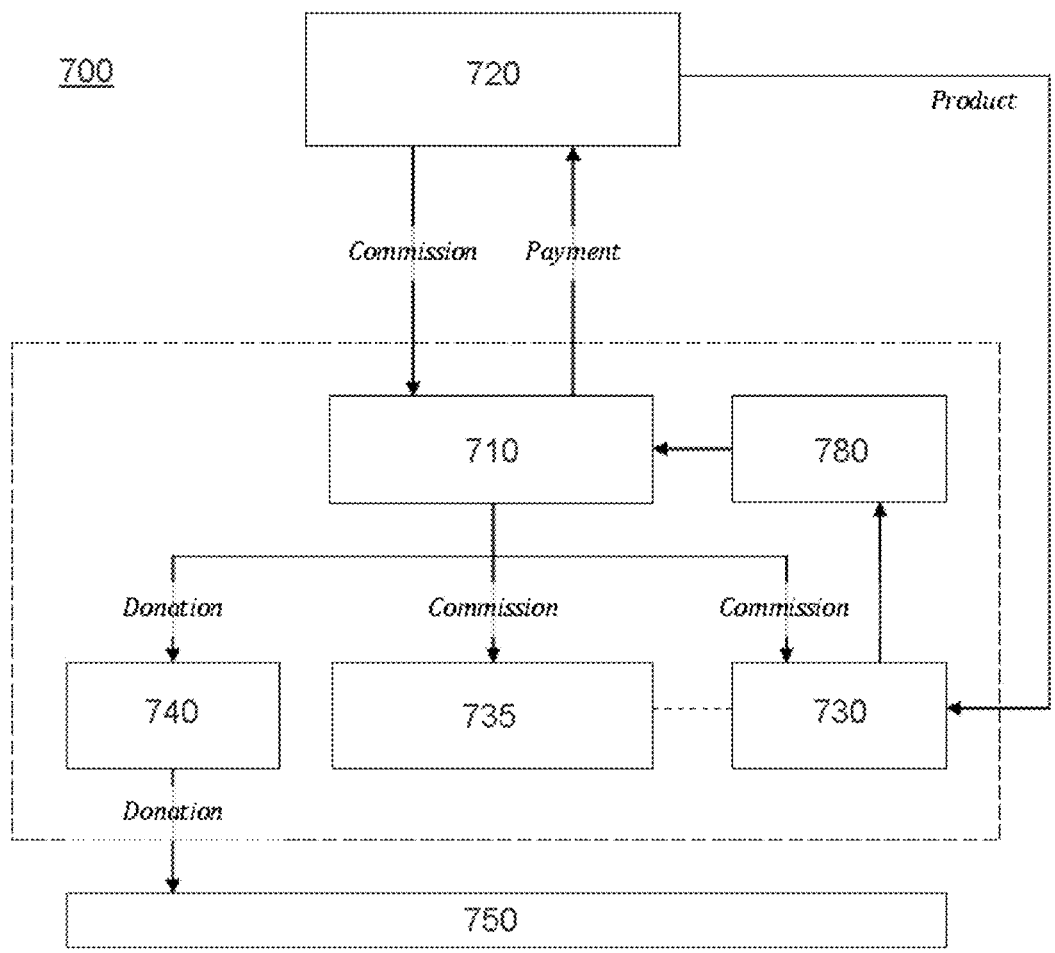
FIG. 7 illustrates one embodiment of a relationship network in accordance with the present invention including a payment affiliate.
Figure 8:
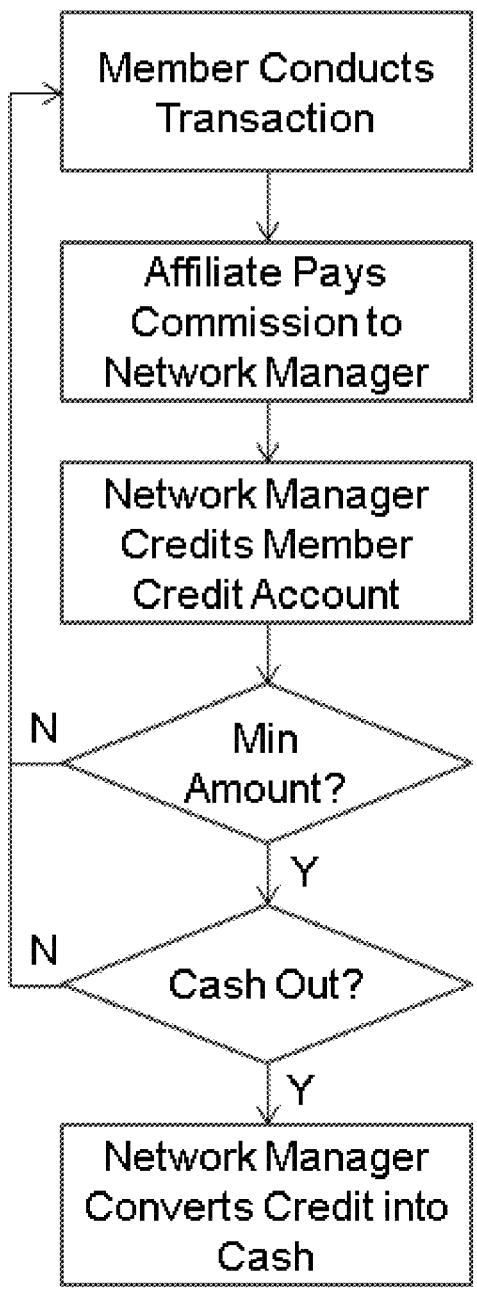
FIG. 8 illustrates one embodiment of a network member commercial transaction.
Figure 9:
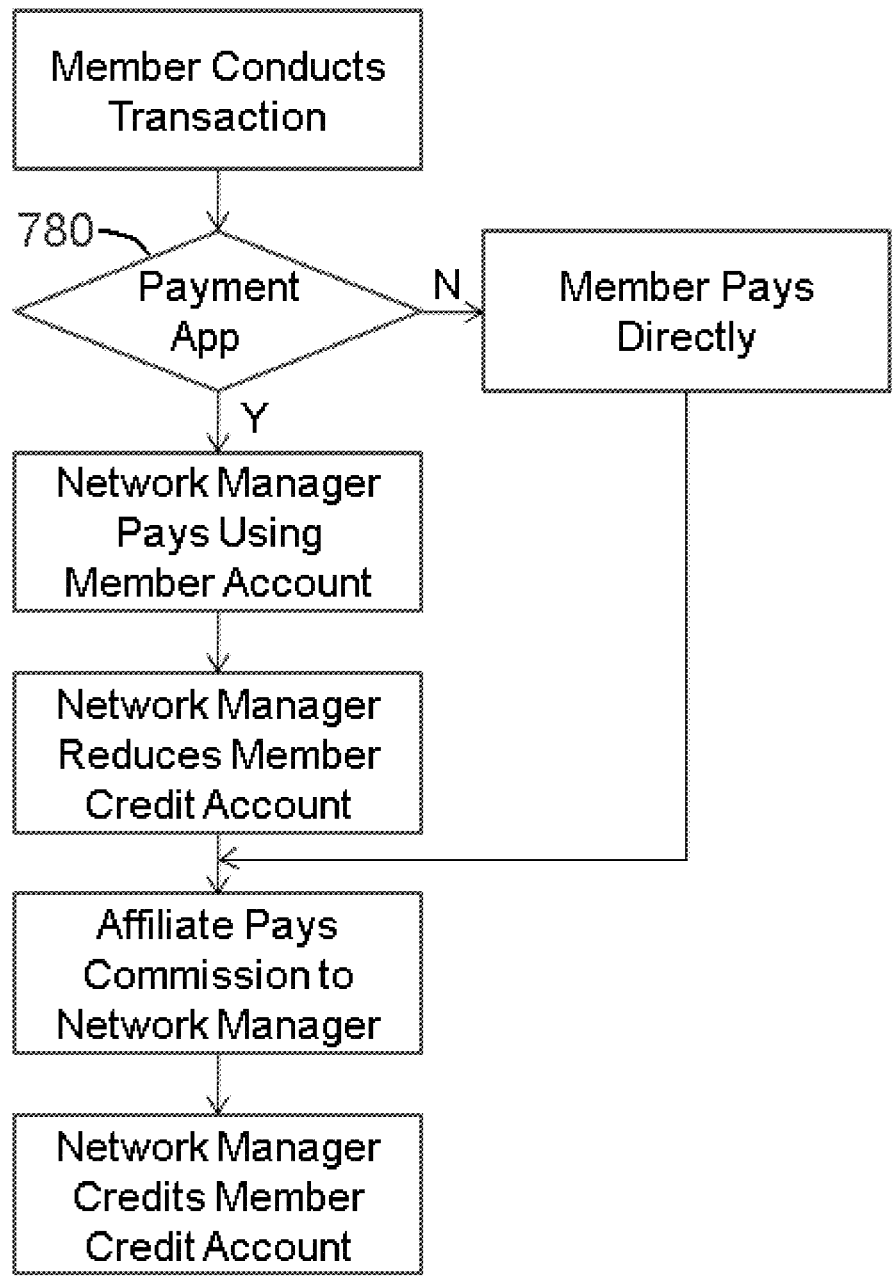
FIG. 9 illustrates one embodiment of a network member commercial transaction including a payment application.

FIG. 7 illustrates one embodiment of a relationship network 700 including a network manager 710, a network affiliate 720, network members 730, 735, a donation manager 740, a donation beneficiary 750, and a payment application 780 that enables a network member to use accumulated commissions to make future purchases. As network members accumulate commissions from their transactions or the transactions of their lineal descendents as shown in FIGS. 3 and 4, for example, such commissions can be retained as a credit in a credit account that is managed by the network manager. Once the credit account reaches a minimum amount as determined by the network manager, the member can have the option to convert such credit into cash as shown, for example, in FIG. 8, whereby the network manager might send the network member a check or transfer such cash into a bank account that is linked to the member's credit account. Alternatively, a network member may use the accumulated credit for new purchases at affiliated companies using a payment application 780 as shown, for example, in FIG. 9, whereby the network manager 710 pays the affiliate company 720 from the member's commission credit account.

For example, if a network member 730 is shopping online through the website of a network affiliate 720, the network affiliate 720 might have a payment option that says "use network credit" or the like, which would ascertain the amount of credit available in the network member's 730 commission credit account through a communication between the network affiliate 720 and the network manager 710. If the network member 730 has enough credit to cover the entire purchase, and the network member 730 elects to pay for the entire purchase with such credit, then the network affiliate 720 will receive the entire payment from the network manager 710. If the network member 730 does not have enough commission credit to cover the entire purchase, or the network member 730 wishes to pay a portion with commission credit and the rest through convention means, the network member 730 may split such payment through a coordination with the network manager 710 and the network affiliate 720. The payment application 780 described herein can take a variety of forms including, but not limited to, a web application as described above, which can be accessed through a computer such as a personal computer, or the like, or through a mobile device such as a mobile phone application or the like. Alternatively, the payment application can be incorporated into a transaction affiliate 670 as described in FIG. 6A or 6B, whereby the transaction affiliate is able to process payment from the network member through a variety of channels including the network member's personal bank account, the network member's commission credit account, and/or with credit from the transaction affiliate. Other methods of achieving such payment are possible.

In another non-limiting embodiment, network members may be further incentivized to shop by earning more with increased shopping volume. This might be termed a "batch bargain," which could be an agreement with affiliated companies where if a certain minimum limit of a certain product or products are sold to network members in a certain period of time (for example one week, or one month, etc.), the network members will get an additional discount for the sale and will receive such discount as a form of cash back or additional credit on its commission credit account. For example, if the current price of a certain product of an affiliated company for network members is $100, and if a quantity of more than 500 of this product is sold to network members in a week, for example, the price of the product will be reduced to $80, and the network member will receive a $20 credit on their member's commission credit account.

The embodiments described herein and the systems and transactions discussed can occur through a variety of platforms. In one non-limiting example, the relationship network and network manager can operate through an online platform, where network members and network affiliates can join and engage with the relationship network through an online platform such as a website or the like, where potential network affiliates can conclude affiliate agreements through an online process, and potential network members can join through email links provided by referring network members. Alternatively, members and affiliates within the relationship network can communicate and do business through software applications resident on personal computers, mobile devices and the like. Existing network members can invite others to join through a web-based or email campaign, or through other means that employ other technologies, such as SMS, text message and others now known or hereinafter developed. In addition, network members can manage their commission accounts, shop online with network affiliates through a secure online portal or through separate network affiliate portals, and/or manage and control the donation beneficiaries and vote on the distribution of donations to such donation beneficiaries.

Certain principles and aspects of the invention can be implemented as hardware, firmware, software or any combination thereof. Moreover, any software application is preferably implemented as an application program tangibly embodied on a program storage unit, computer readable medium, or machine readable medium. One of ordinary skilled in the art would recognize that a "machine readable medium" is a medium capable of storing data and can be in a form of a digital circuit, an analog circuit or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The relationship network described herein promotes social engagement between network members, network affiliates and donation beneficiaries. Online network communities can be created and expanded using the relationship network as a platform. In addition, various forms of commercial streams can be created using transaction and payment affiliates as described herein, or as hereinafter developed. Increased participation in the relationship network by all parties to the network can form a powerful tool as a defender of environmental and social causes and a promoter of good will worldwide, and the network organization promotes omni-beneficial collaboration, brand loyalty, and incentives for everyone to be an active participant and promoter of its growth.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A system for distributing commissions within a relationship network comprising:
   a) a network manager device;
   b) at least one network affiliate device that has an affiliate relationship with the network manager device; and
   c) a plurality of network member devices that each have a member relationship with the network manager device, the plurality of network member devices including at least one primary network member device and at least one additional network member device related to the at least one primary network member device through referral or invitation to the relationship network, wherein the at least one primary network member device and the at least one additional network member device form a lineal arrangement whereby each additional network member device that joins the relationship network becomes a lineal descendent of the referring network member device, d) wherein a transaction between a network affiliate device and a network member device defined as a transacting network member device generates a commission by the network affiliate device, a portion of the commission being distributed as a donation to at least one donation beneficiary device that promotes environmental or social concerns, and another portion of the commission being defined as a member commission and distributed to the transacting network member device and to each lineal descendent of the transacting network member device, wherein the lineal arrangement of referred network member devices are associated to each other and to the primary network member device by levels, with the primary network member device residing on level one (1) of the lineal arrangement and each additional referred member device residing on a level that is incremented relative to the level location of the network member device that referred the additional referred member device to the relationship network, and wherein the member commission (MC) is distributed in a proportionate amount to each network member device in a referral lineage between and including the transacting network member device defined as a purchasing network device and the primary network member device.

2. The system of claim 1, wherein the donation is determined by a vote of the plurality of network member devices.

3. The system of claim 2, further comprising a plurality of donation beneficiary devices and wherein the donation is allocated to the donation beneficiary devices in a proportionate amount based on the vote of the plurality of network member devices.

4. The system in accordance with claim 3, wherein each donation beneficiary device receives a proportionate share (PDV) of the portion of the commission being distributed as a donation and defined by a total donation amount (TDA) based on a number of votes for such donation beneficiary (NVP) relative to the number of network members (NMBR) in accordance with the following equation:

$$PDV = TDA \cdot \frac{NVP}{NMBR}.$$

5. The system in accordance with claim 4, further comprising a network donation manager device, and wherein the donation is distributed by the network manager device to the network donation manager device for donation to the at least one donation beneficiary device.

6. The system in accordance with claim 1, wherein the member commission is redeemable in the form of credit at a network affiliate device.

7. The system in accordance with claim 6, wherein the network manager device processes redeemed credit as payment to a network affiliate device.

8. The system in accordance with claim 7, wherein the network member device initiates a credit redemption through a mobile payment application.

9. The system in accordance with claim 1, wherein the commission is defined as a total commission (TC) that is based on a pre-determined rate (RATE) of a purchase value (PV) of a transaction, wherein TC =RATE ·PV, and wherein the RATE is fixed or variable or a combination of the same.

10. The system in accordance with claim 1, wherein the proportionate amount of the member commission (MC) received by each network member device in the referral lineage is reduced in half with each level of separation from the purchasing network member device to the primary network member device.

11. The system in accordance with claim 10, wherein an individual commission (IC) received by a network member device in the referral lineage positioned at a network member level (NML), the referral lineage having a number of levels defined between 1 and a purchasing network member level (PML), is defined as:

$$IC = \frac{MC}{2^{(PML-NML+1)}}.$$

12. The system in accordance with claim 1, further comprising a transaction affiliate device that has a transaction affiliate relationship with the network manager device and facilitates the transaction between the network member device and either the network affiliate device or a non-network affiliate device.

13. The system in accordance with claim 12, wherein use of the transaction affiliate device by a network member device automatically associates such use with the network manager device.

14. The system in accordance with claim 12, wherein the transaction between the network member device and either the network affiliate device or a non-network affiliate device using the transaction affiliate device generates a transaction commission by the transaction affiliate device to the network manager device.

15. The system in accordance with claim 1, wherein the receipt of the member commission by the plurality of network member devices is a taxable event.

16. The system in accordance with claim 1, wherein the distribution of the donation is a taxable event.

17. A method of distributing a commission within a relationship network comprising:
   a) providing a network manager device;
   b) the network manager device engaging in an affiliate relationship with at least one network affiliate device;
   c) the network manager device engaging in a member relationship with at least one network member device;
   d) the at least one network member device concluding a transaction with the at least one network affiliate device and defined as a transacting network member device;
   e) the at least one network affiliate device generating a commission to the network manager device based on a value of the transaction, a portion of the commission defined as a member commission and being distributed to the at least one network member device, and
   f) the network manager device distributing a donation generated from another portion of the commission to benefit at least one donation beneficiary device that promotes environmental or social causes,
   the method further comprising expanding the relationship network through the joining of additional network member devices by referral from a primary network member device to form a lineal arrangement of referred network member devices associated to each other and to the primary network member device by levels, with the primary network member device residing on, level one (1)

of the lineal arrangement and each additional referred member device residing on a level that is incremented relative to the level location of the network member device that referred the additional referred member device to the relationship network, and wherein the member commission (MC) is distributed in a proportionate amount to each network member device in a referral lineage between and including the transacting network member device defined as a purchasing network member device and the primary network member device.

18. The method in accordance with claim 17, further comprising establishing a donation manager device separate from the network manager device for distributing the donation to the at least one environmental or social cause or project.

19. The method in accordance with claim 18, further comprising a plurality of network member devices, and wherein the donation is allocated based on a vote of the plurality of network member devices.

20. The method in accordance with claim 19, further comprising a plurality of donation beneficiary devices and wherein the donation is allocated to the donation beneficiary devices in a proportionate amount based on a vote of the plurality of network member devices.

21. The method in accordance with claim 17, further comprising the at least one network member device redeeming the member commission as a credit with the at least one network affiliate device.

22. The method in accordance with claim 21, further comprising the at least one network member device using a mobile payment application to redeem the credit.

23. The method in accordance with claim 17, wherein an individual commission (IC) received by a network member device in the referral lineage positioned at a network member level (NML), the referral lineage having a number of levels defined between 1 and a purchasing network member level (PML), is defined as:

$$IC = \frac{MC}{2^{(PML-NML+1)}}.$$

24. The method in accordance with claim 17, further comprising a transaction affiliate device that has a transaction affiliate relationship with the network manager device and facilitates the transaction between the network member device and either the network affiliate device or a non-network affiliate device.

25. The method in accordance with claim 24, wherein use of the transaction affiliate device by a network member device automatically associates such use with the network manager device.

26. The method in accordance with claim 24, wherein the transaction between the network member device and either the network affiliate device or a non-network affiliate device using the transaction affiliate device generates a transaction commission by the transaction affiliate device to the network manager device.

27. The method in accordance with claim 17, wherein the receipt of the member commission by the plurality of network member devices is a taxable event.

28. The method in accordance with claim 17, wherein the distribution of the donation is a taxable event.

* * * * *